Jan. 29, 1957    L. L. WEBER    2,779,852
TEMPERATURE RESPONSIVE CONTROL CIRCUIT
Filed Aug. 23, 1955
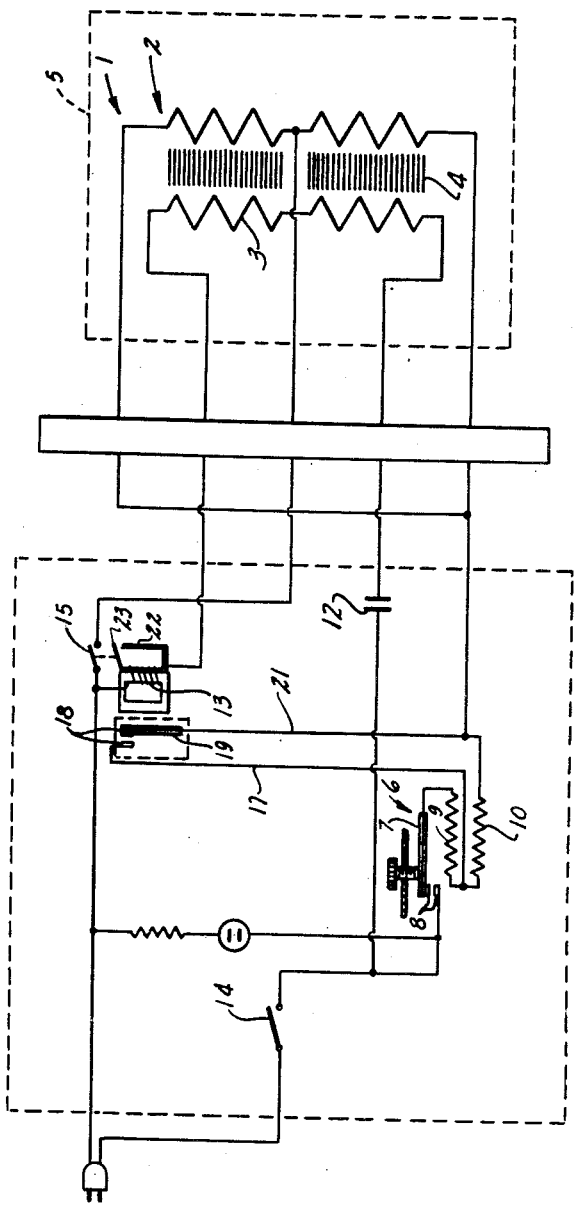
INVENTOR.
LEO L. WEBER
BY
ATTORNEY

United States Patent Office 2,779,852
Patented Jan. 29, 1957

2,779,852

TEMPERATURE RESPONSIVE CONTROL CIRCUIT

Leo L. Weber, Logansport, Ind., assignor to Essex Wire Corporation

Application August 23, 1955, Serial No. 530,154

1 Claim. (Cl. 219—20)

This invention relates to temperature responsive control circuits and in particular to a circuit for controlling the heat output of an electric blanket and similarly heated fabrics.

The invention is closely related to the patent application of Leslie A. Barr et al., Serial No. 457,247, filed September 20, 1954, entitled "Temperature Responsive Control Circuit." In this patent application, Barr discloses a control circuit which provides for a safety control over the heat output of a blanket. Use is also made of a temperature sensitive structure as disclosed and claimed in U. S. patent to B. T. Vogler No. 2,725,447, issued March 29, 1955, and assigned to the same assignee as the present application and the Barr et al. application.

Inasmuch as an electric blanket usually employs a control box remotely located from the blanket such as on a night stand, bed head piece, or on the bedside itself, it is usually desirable to make the control box as compact and as eye appealing as possible. In compacting the components of the circuit, it has been found that the heat generated by control components affects the operation of bi-metal components of such circuits.

In the Barr circuit a bi-metallic element serves to control the blanket temperature of the blanket as selected by the user. The bi-metal is heated in accordance with the energy delivered to the blanket by the use of a heater which may be in series or in parallel with the load and adjacent the bi-metal. By adjusting the bi-metal in a compensatory fashion with regard to the heat generated by the circuit components or, specifically the choke-coil relay of Barr, the control can be designed to give excellent operating results. However, the choke-coil relay is comparatively slow in heating in comparison to the heater. In addition, the choke-coil relay may be located as remotely as possible from the bi-metallic element so that there is a considerable time lapse before the heat dissipated by the choke coil relay is absorbed by the bi-metal element. Therefore, if the control is calibrated with respect to steady state operation, the heater must heat beyond its normal steady state value on starting to cause the bi-metallic element to open the contacts of the cycling control. As a result, the load or, blanket, is initially heated to higher temperature than the steady state temperature indicated by the operator's adjustment.

It is, therefore, an object of this invention to provide a new and improved control circuit for electric blankets which eliminates over-shooting of a selected load temperature.

Referring to the diagram, a combination heating and sensing element is indicated at 1. The heating wire 2 is separated from the sensing wire 3 by insulation 4 as discussed in the aforementioned Vogler patent. The insulator 4 as discussed in said Vogler patent is an insulator at normal operating temperature of the heating wire 2, but becomes a conductor at a pre-determined higher temperature. The combined heating and sensing element may be arranged within a blanket 5.

The heat output of the blanket is controlled primarily by operation of the ambient controller 6. The ambient controller consists of a bi-metal 7, contacts 8, heater 9, auxiliary heater 10, and adjusting screw 11. As indicated previously, this ambient controller is separate from the electric blanket and is, therefore, functioned by room temperature. If the room temperature decreases, for example, the bi-metal 7 moves to close contacts 8 and current is supplied the blanket through the series heater 9. After some time, this series heater causes a temperature rise in the bi-metal 7 and contacts 8 are opened. The ambient controller will continue to cycle in this fashion so long as room temperature is at, or lower than, that temperature at which the bi-metal will close contacts 8. The adjusting screw 11 permits manual selective adjustment of the bi-metal to obtain the associated and desired blanket temperature.

The ambient control is, therefore, a measure of room temperature and the integrated time interval of current applied to the blanket. It is additionally necessary to provide means for sensing abnormal blanket temperatures such as might occur if a portion of the blanket becomes overheated such as by folding. The sensing wire 3 provides such sensing means. When a pre-determined overheated condition occurs, the insulator 4 inverts to a conductor and permits current to flow between the heater wire 4 and the sensing wire 3. This flow of current is the signal which is used by the safety control circuit hereinafter described to interrupt the flow of current to the electric blanket to avoid the danger that might develop from continued heating of a locally overheated blanket section.

The control circuit includes a series resonant circuit consisting of the condenser 12 and the inductive choke coil relay 13. Thus, the inductor 13, sensing wire 3, and condenser 12 are across the line and in parallel with the heater wire 2.

The blanket heating circuit includes the on-off switch 14, safety switch 15, ambient controller 6, and heater wire 2.

The inductor 13, sensing wire 3, and condenser 12 are selected so that a condition of series resonance occurs in this circuit upon the application of line voltage. The inductor 13 is further designed so that the appended iron core 22 provides a leakage flux path which at peak resonance pulls in armature 23.

Any localized blanket overheating which causes insulator 4 to invert to a conductor will disturb the resonance and result in a fall off in leakage flux in the iron core 22. The armature 23 is linked to the switch 15 so that when armature 23 drops out the blanket heater wire is open circuited.

As indicated previously, the inductor relay is a heat generating source. Therefore, when confined in a control box, the heat output of the inductor relay will affect to a measureable degree the operation of the bi-metal blade 7. In effect, the adjustment of bi-metal blade 7 in operation is based upon the cumulative heating effect of not only the series heater 9, but also all other heating generating components. When the control is thermally stabilized there is no problem in adjusting the control so that a desired blanket temperature is arrived at. On starting of the blanket, however, the inductor relay and any other heat generating source takes time to reach thermal equilibrium. As a result, the ambient controller remains closed until sufficient heat is generated by the heater 9 to compensate for the lack of heat from the inductor relay. Due to the contacts 8 remaining closed for the longer time more current will be supplied to the blanket and, as a result, on initial start, due to the lack of thermal stabilization, the initial blanket temperature will rise above that which is selected by the user of the blanket as a desirable blanket temperature. The over-shooting, of course, induces the user to compensate for the higher temperature requiring, therefore, considerable manual adjustment and consequent irritation of the user. In order to overcome the over-shooting tendency, the auxiliary heater 10 is used to complement the heat output of the ambient controller heater 9 to compensate for the lack of heat from the heat generating inductor relay 13 on the starting of the control. In effect, therefore, the cumulative effect of the heater 9 and heater 10 on starting is equivalent to the cumulative effect of the heater 9 and the inductor relay 13 after the inductor relay reaches its stabilized operating temperature. In order to accomplish this result, it is of course necessary to cut out the auxiliary heater 10 when the inductor relay is thermally stabilized.

Referring to the diagram, it will be noted that the heating circuit includes the heater 9 and the auxiliary heater 10 in series. The auxiliary heater 10 is shunted by lead 17, contacts 18, and bi-metal 19 of the normally open thermostat 20 and lead 21. The thermostat 20 is located near the surface of the inductor relay 13 and is, therefore, under the influence of the heat dissipated by the inductor 13. The thermostat 20 is normally adjusted so that when the inductor relay is thermally stabilized, the contacts 18 are closed. In this way, line current is shunted by the auxiliary heater through the lead 17, thermostat 20, and lead 21. In this manner, the heater 9 of the ambient controller 6 is complemented by outside heat which is substantially equal throughout the operation of the blanket control.

Having thus described my invention, I claim:

In a temperature control device for an electrically heated blanket including an adjustable bimetallic thermostatic switch to energize and deenergize the heating circuit of said blanket depending upon the temperature of said thermostatic switch, said thermostatic switch being exposed to heat from a heater connected in the heating circuit of said blanket and to heat from a second component of said temperature control device connected in a safety control circuit in addition to heat from the air of the room in which said blanket is located; means to supply additional heat to said thermostatic switch until the heat emitted by said second component attains a desired level whereby said thermostatic switch is influenced to maintain said blanket at a substantially constant temperature regardless of the variation in the heat emitted by said second component, said means comprising: an auxiliary heater also connected in said heating circuit of said blanket and arranged to apply heat when energized to said thermostatic switch, and a second bimetallic thermostatic switch responding to the heat emitted by said second component to energize said auxiliary heater when said heater circuit of said blanket is energized until the heat emitted by said second component attains said desired level.

References Cited in the file of this patent

UNITED STATES PATENTS

| | | |
|---|---|---|
| 1,718,748 | Marshall | June 25, 1929 |
| 2,479,319 | Crowley et al. | Aug. 16, 1949 |
| 2,498,127 | Kuhn | Feb. 21, 1950 |
| 2,709,216 | Moran et al. | May 24, 1955 |